(12) United States Patent
Lee et al.

(10) Patent No.: US 12,504,071 B2
(45) Date of Patent: Dec. 23, 2025

(54) DISCONNECTING DEVICE

(71) Applicants: Hyundai Motor Company, Seoul (KR); Kia Corporation, Seoul (KR); HYUNDAI WIA CORPORATION, Changwon-si (KR)

(72) Inventors: Tae Hyung Lee, Whasung-Si (KR); Jin Woo Byeon, Whasung-Si (KR); Kook Lae Cho, Whasung-Si (KR); Dong Yun Lee, Whasung-Si (KR)

(73) Assignees: Hyundai Motor Company, Seoul (KR); Kia Corporation, Seoul (KR); HYUNDAI WIA CORPORATION, Changwon-Si (KR)

( * ) Notice: Subject to any disclaimer, the term of this patent is extended or adjusted under 35 U.S.C. 154(b) by 0 days.

(21) Appl. No.: 18/680,256

(22) Filed: May 31, 2024

(65) Prior Publication Data
US 2025/0215973 A1 Jul. 3, 2025

(30) Foreign Application Priority Data
Dec. 29, 2023 (KR) .................. 10-2023-0197135

(51) Int. Cl.
*F16H 63/32* (2006.01)
(52) U.S. Cl.
CPC ....... *F16H 63/32* (2013.01); *F16H 2063/321* (2013.01); *F16H 2063/324* (2013.01)
(58) Field of Classification Search
CPC ............... F16H 63/32; F16H 2063/321; F16H 2063/324; F16D 13/22; F16D 13/10; F16D 13/52; F16D 2023/123; F16D 2023/141; F16D 23/142
See application file for complete search history.

(56) References Cited

U.S. PATENT DOCUMENTS

| | | | | |
|---|---|---|---|---|
| 6,460,677 | B1* | 10/2002 | Roscoe | F16H 48/34 192/93 A |
| 6,802,794 | B2* | 10/2004 | Showalter | B60K 17/3467 192/48.5 |
| 2002/0142877 | A1* | 10/2002 | Williams | B60K 17/3467 475/198 |
| 2005/0202920 | A1* | 9/2005 | Kelley | B60K 17/344 475/207 |
| 2006/0011001 | A1* | 1/2006 | Showalter | F16H 25/186 74/23 |
| 2007/0049451 | A1* | 3/2007 | Mizon | B60K 17/3467 475/210 |
| 2009/0236197 | A1* | 9/2009 | Mizon | B60K 17/3467 192/93 R |

(Continued)

FOREIGN PATENT DOCUMENTS

SE 542752 C2 * 7/2020 ............ B60K 17/34

*Primary Examiner* — Farhana Pervin
(74) *Attorney, Agent, or Firm* — Morgan Lewis & Bockius LLP

(57) ABSTRACT

A disconnecting device may include a ball ramp plate rotatably provided on a guide plate, a pressing module provided coaxially with the ball ramp plate and configured to selectively press a clutch while being moved in an axial direction by a rotation of the ball ramp plate, and a separation module provided coaxially with the pressing module and configured to selectively separate a first member and a second member in accordance with the rotation of the ball ramp plate.

19 Claims, 15 Drawing Sheets

(56) References Cited

U.S. PATENT DOCUMENTS

| | | | |
|---|---|---|---|
| 2017/0175823 A1* | 6/2017 | Cooper | F16D 21/06 |
| 2017/0241486 A1* | 8/2017 | Pritchard | F16D 23/14 |
| 2018/0135751 A1* | 5/2018 | Maki | F16H 63/32 |
| 2018/0264939 A1* | 9/2018 | Ryman | B60K 17/344 |
| 2018/0290533 A1* | 10/2018 | Pritchard | B60K 17/3462 |
| 2020/0094675 A1* | 3/2020 | Johnston | B60K 17/356 |
| 2021/0115980 A1* | 4/2021 | Sugiura | H02K 7/108 |
| 2022/0170515 A1* | 6/2022 | Raghavan | B22F 3/164 |
| 2022/0340004 A1* | 10/2022 | Bird | B60K 17/356 |

* cited by examiner

DISCONNECTING DEVICE

CROSS-REFERENCE TO RELATED APPLICATION

The present application claims priority to Korean Patent Application No. 10-2023-0197135 filed on Dec. 29, 2023, the entire contents of which is incorporated herein for all purposes by this reference.

BACKGROUND OF THE PRESENT DISCLOSURE

Field of the Present Disclosure

The present disclosure relates to a disconnecting device, and more particularly, to a disconnecting device capable of selectively blocking power from an auxiliary driving wheel and simultaneously adjusting a pressing force of a clutch.

Description of Related Art

In general, a driveshaft of an auxiliary driving wheel of a four-wheel drive vehicle is provided with a disconnecting device. The disconnecting device selectively blocks the transmission of power to left and right wheels from a driving source (e.g., an engine or an electric motor).

Furthermore, the driveshaft of the vehicle is provided with a limited-slip differential (LSD) that restricts a differential operation implemented by a differential. The limited-slip differential may restrict the differential operation implemented by the differential by adjusting a pressing force to be applied to a clutch.

Generally, an actuator for implementing the disconnecting device and an actuator for implementing the limited-slip differential need to be separately provided in the vehicle, which causes a problem in that the disconnecting device and the limited-slip differential increase in size, and it is difficult to package the vehicle.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a disconnecting device configured for including a compact structure and reducing the number of components.

The present disclosure also attempts to provide a disconnecting device configured for implementing a disconnecting function and a pressing function of a clutch by use of a single actuator.

A disconnecting device according to various exemplary embodiments of the present disclosure may include a ball ramp plate rotatably provided on a guide plate, a pressing module provided coaxially with the ball ramp plate and configured to selectively press a clutch while being moved in an axial direction by a rotation of the ball ramp plate, and a separation module provided coaxially with the pressing module and configured to selectively separate a first member and a second member in accordance with the rotation of the ball ramp plate.

In several exemplary embodiments of the present disclosure, the pressing module may include: the ball ramp plate; a movable plate engaged to the ball ramp plate and configured to move in the axial direction while being rotated by the rotation of the ball ramp plate, the movable plate including a first cam track formed in a circumferential direction thereof; a ball provided in the first cam track; and a clutch pressing plate configured to selectively press the clutch in accordance with the movement of the movable plate in the axial direction thereof.

In several exemplary embodiments of the present disclosure, the first cam track may be formed so that the movable plate moves in a first direction in the axial direction when the movable plate rotates in one direction, and the movable plate moves in a second direction in the axial direction when the movable plate rotates in the other direction thereof.

In several exemplary embodiments of the present disclosure, the first cam track may be formed in an arc shape, and the first cam track may be formed so that a depth thereof increases in a direction from a first side to a second side thereof.

In several exemplary embodiments of the present disclosure, the first cam track may have a constant gradient.

In several exemplary embodiments of the present disclosure, a pair of movable protrusions formed on an external portion of the movable plate may be coupled to ramp coupling grooves formed in the ball ramp plate.

In several exemplary embodiments of the present disclosure, the movable protrusions may penetrate guide circumference slots formed in the guide plate in a circumferential direction of the guide plate and be coupled to the ramp coupling grooves.

In several exemplary embodiments of the present disclosure, the pressing module may further include a stationary plate provided to face the movable plate.

In several exemplary embodiments of the present disclosure, an auxiliary cam track corresponding to the first cam track may be formed in the stationary plate, and the ball may be provided between the first cam track and the auxiliary cam track.

In several exemplary embodiments of the present disclosure, the auxiliary cam track may have a constant gradient.

In several exemplary embodiments of the present disclosure, the pressing module may further include a return spring providing an elastic force in a direction in which the clutch pressing plate moves away from the clutch.

In several exemplary embodiments of the present disclosure, the disconnecting device may further include a bearing mounted between the clutch pressing plate and the movable plate.

In several exemplary embodiments of the present disclosure, the separation module may include: a cylindrical cam configured to rotate integrally with the ball ramp plate and including a second cam track formed in a circumferential direction thereof; a shift fork provided in the second cam track and configured to be moved in the axial direction by a rotation of the cylindrical cam; and a sleeve configured to couple the first member and the second member or separate the first member and the second member in accordance with a movement of the shift fork.

In several exemplary embodiments of the present disclosure, the second cam track may be formed so that the shift fork moves in one direction in the axial direction when the cylindrical cam rotates in a first direction, and the shift fork moves in a second direction in the axial direction when the cylindrical cam rotates in the other direction thereof.

In several exemplary embodiments of the present disclosure, the second cam track may include: a first portion formed in a circumferential direction of the cylindrical cam;

a second portion formed to be inclined in the axial direction from an end portion of the first portion; and a third portion formed in the circumferential direction from an end portion of the second portion.

In several exemplary embodiments of the present disclosure, the shift fork may include: a fork body integrally coupled to the sleeve; and fork protrusions provided at first and second opposite sides of the fork body and movably mounted in the second cam track.

In several exemplary embodiments of the present disclosure, the fork protrusion may penetrate a guide shaft slot formed in the guide plate in the axial direction thereof and be movably mounted in the second cam track.

In several exemplary embodiments of the present disclosure, the disconnecting device may further include a drive motor configured to provide power for rotating the ball ramp plate; and a speed reducer configured to decelerate power of the drive motor and gear-engage with a ramp gear formed on an external periphery of the ball ramp plate.

In several exemplary embodiments of the present disclosure, the pressing module and the clutch may come into contact with each other after the first member and the second member are completely coupled by the separation module.

According to the embodiments, the pressing module, which presses the clutch, and the separation module, which selectively couple the hub clutch and the output shaft, are disposed coaxially, which may reduce the overall size of the disconnecting device and implement the compact package of the vehicle.

Other effects, which may be obtained or expected by the exemplary embodiments of the present disclosure, will be directly or implicitly included in the detailed description of the present disclosure. That is, various effects expected according to an exemplary embodiment of the present disclosure will be included in the detailed description to be described below.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
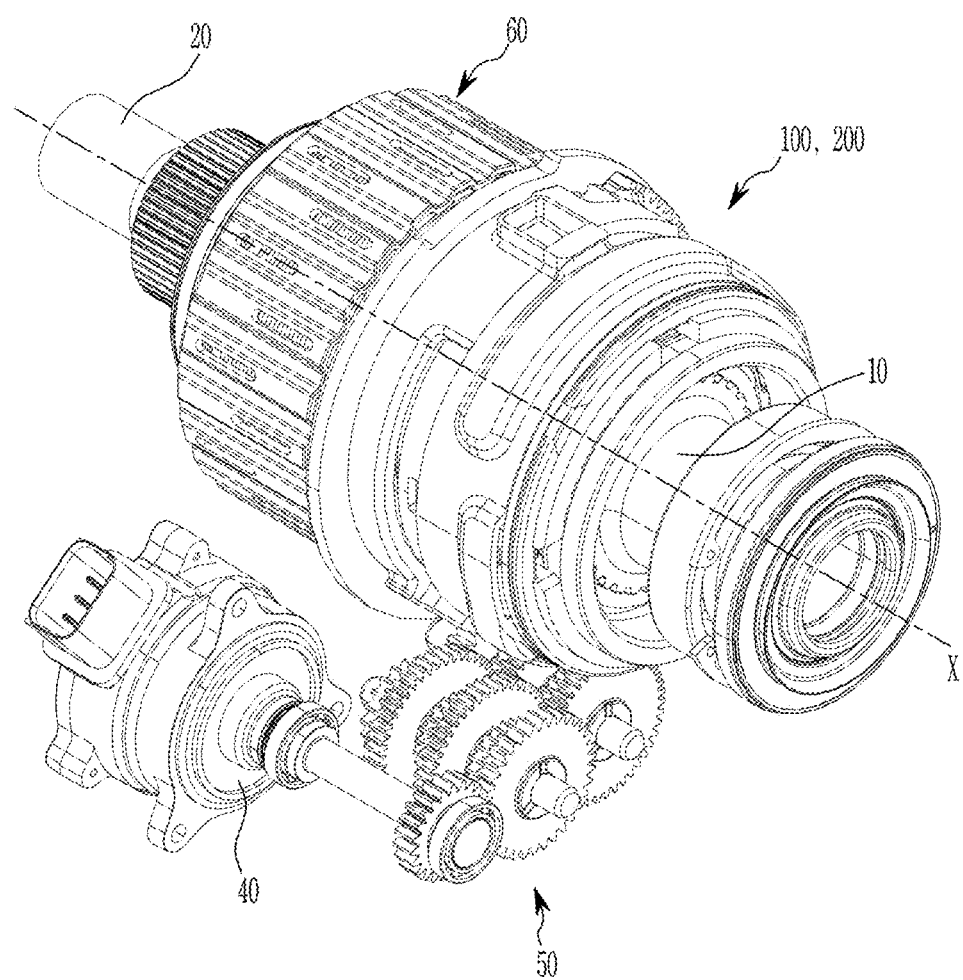
FIG. 1 is a perspective view exemplarily illustrating a configuration of a disconnecting device according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The terms used herein are merely for describing a specific embodiment, and not intended to limit the present disclosure. The singular expressions used herein are intended to include the plural expressions unless the context clearly dictates otherwise. It is to be understood that the term "comprise (include)" and/or "comprising (including)" used in the present specification means that the features, the integers, the steps, the operations, the constituent elements, and/or component are present, but the presence or addition of one or more of other features, integers, steps, operations, constituent elements, components, and/or groups thereof is not excluded. The term "and/or" used herein includes any one or all the combinations of listed related items.

The present disclosure will be described in detail with reference to the accompanying drawings so that those with ordinary skill in the art to which the present disclosure pertains may easily carry out the embodiments. However, the present disclosure may be implemented in various different ways and is not limited to the exemplary embodiments described herein.

A part irrelevant to the description will be omitted to clearly describe the present disclosure, and the same or similar constituent elements will be designated by the same reference numerals throughout the specification.

Furthermore, the size and thickness of each component illustrated in the drawings are arbitrarily shown for ease of description, but the present disclosure is not limited thereto. To clearly describe several portions and regions, thicknesses thereof are enlarged.

The suffixes 'module', 'unit', 'part', and/or 'portion' used to describe constituent elements in the following description are used together or interchangeably to facilitate the description, but the suffixes themselves do not have distinguishable meanings or functions.

Furthermore, in the description of the included embodiment, the specific descriptions of publicly known related technologies will be omitted when it is determined that the specific descriptions may obscure the subject matter of the exemplary embodiment included in the present specification.

Furthermore, it should be interpreted that the accompanying drawings are provided only to allow those skilled in the art to easily understand the exemplary embodiments included in the present specification, and the technical spirit included in the present specification is not limited by the accompanying drawings, and includes all alterations, equivalents, and alternatives that are included in the spirit and the technical scope of the present disclosure.

The terms including ordinal numbers such as "first," "second," and the like may be used to describe various constituent elements, but the constituent elements are not limited by the terms.

In the following description, the singular expression "one" or "single" may be interpreted as the singular or plural expression unless explicitly stated.

These terms are used only to distinguish one constituent element from another constituent element.

Hereinafter, a disconnecting device according to an exemplary embodiment will be described in detail with reference to the accompanying drawings.

Figure 2:
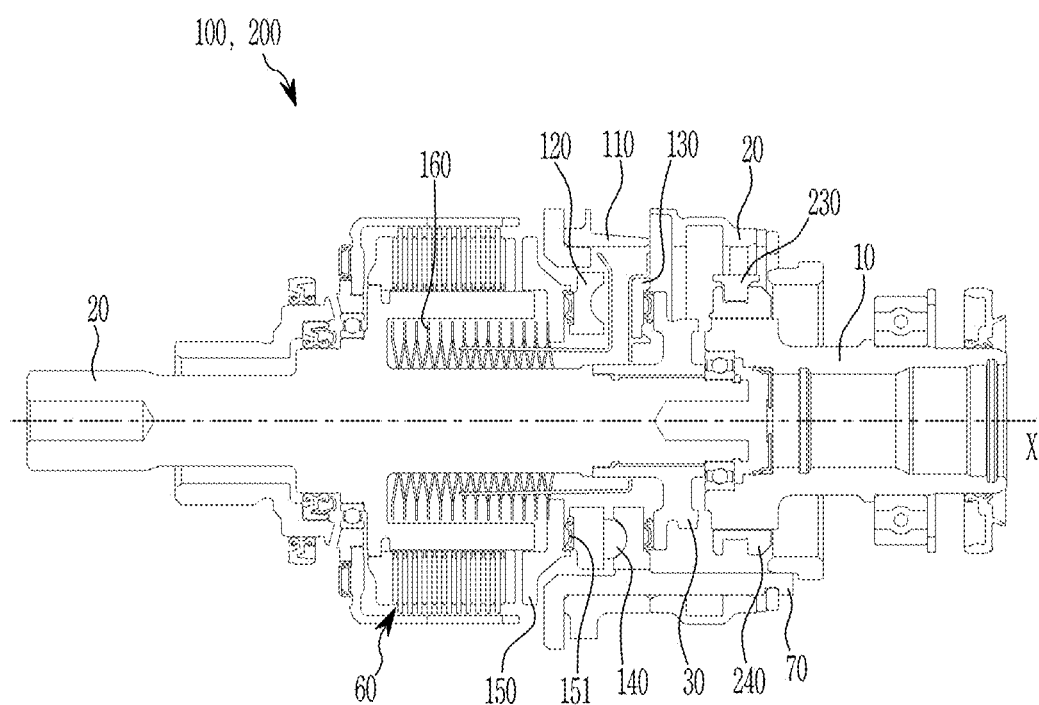
FIG. 2 is a cross-sectional view exemplarily illustrating the configuration of the disconnecting device according to the exemplary embodiment of the present disclosure.

FIG. 1 is a perspective view exemplarily illustrating a configuration of a disconnecting device according to an exemplary embodiment of the present disclosure. FIG. 2 is a cross-sectional view exemplarily illustrating the configuration of the disconnecting device according to the exemplary embodiment of the present disclosure. Furthermore, FIG. 3 is an exploded perspective view exemplarily illustrating the configuration of the disconnecting device according to the exemplary embodiment of the present disclosure.

Figure 3:
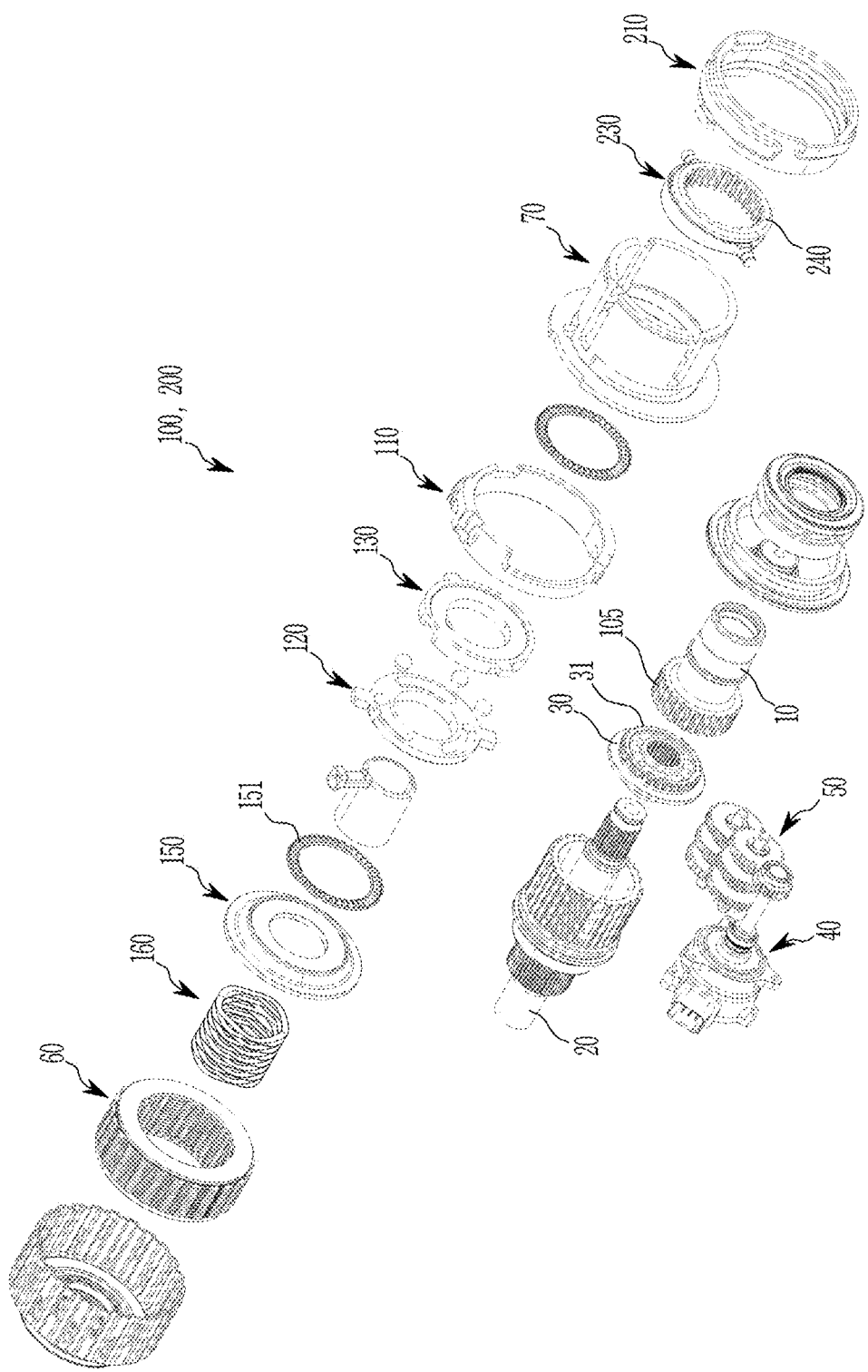
FIG. 3 is an exploded perspective view exemplarily illustrating the configuration of the disconnecting device according to the exemplary embodiment of the present disclosure.

As illustrated in FIG. 1, FIG. 2, and FIG. 3, the disconnecting device according to the exemplary embodiment of the present disclosure may include a ball ramp plate 110 configured to be rotated by power, a pressing module 100 configured to selectively press a clutch 60 while being moved in an axial direction X by the rotation of the ball ramp plate 110, and a separation module 200 configured to selectively separate an output shaft 10 and a hub clutch 20 in accordance with the rotation of the ball ramp plate 110. The output shaft 10, the hub clutch 20, the pressing module 100, and the separation module 200 may be coaxially disposed. In an exemplary embodiment of the present disclosure, as necessary, the output shaft 10 may be referred to as a first member, and the hub clutch 20 may be referred to as a second member.

In the exemplary embodiment of the present disclosure, an example will be described in which the clutch 60 is a wet multi-plate clutch applied to an electric limited-slip differential (eLSD). However, the protection scope of the present disclosure is not limited thereto. The clutch 60 of the exemplary embodiment of the present disclosure may be a coupling device configured to distribute torque to a front wheel and a rear wheel or be a wet multi-plate clutch applied to an active transfer case (ATC).

Hereinafter, a configuration of the pressing module will be described in detail with reference to the accompanying drawings.

Figure 4:
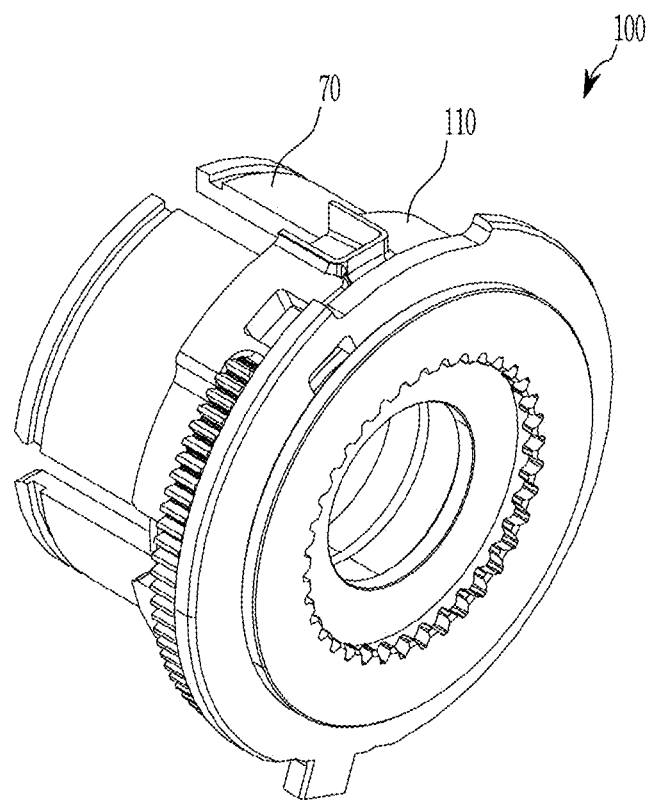
FIG. 4 is a perspective view exemplarily illustrating a configuration of a pressing module according to the exemplary embodiment of the present disclosure.
Figure 5:
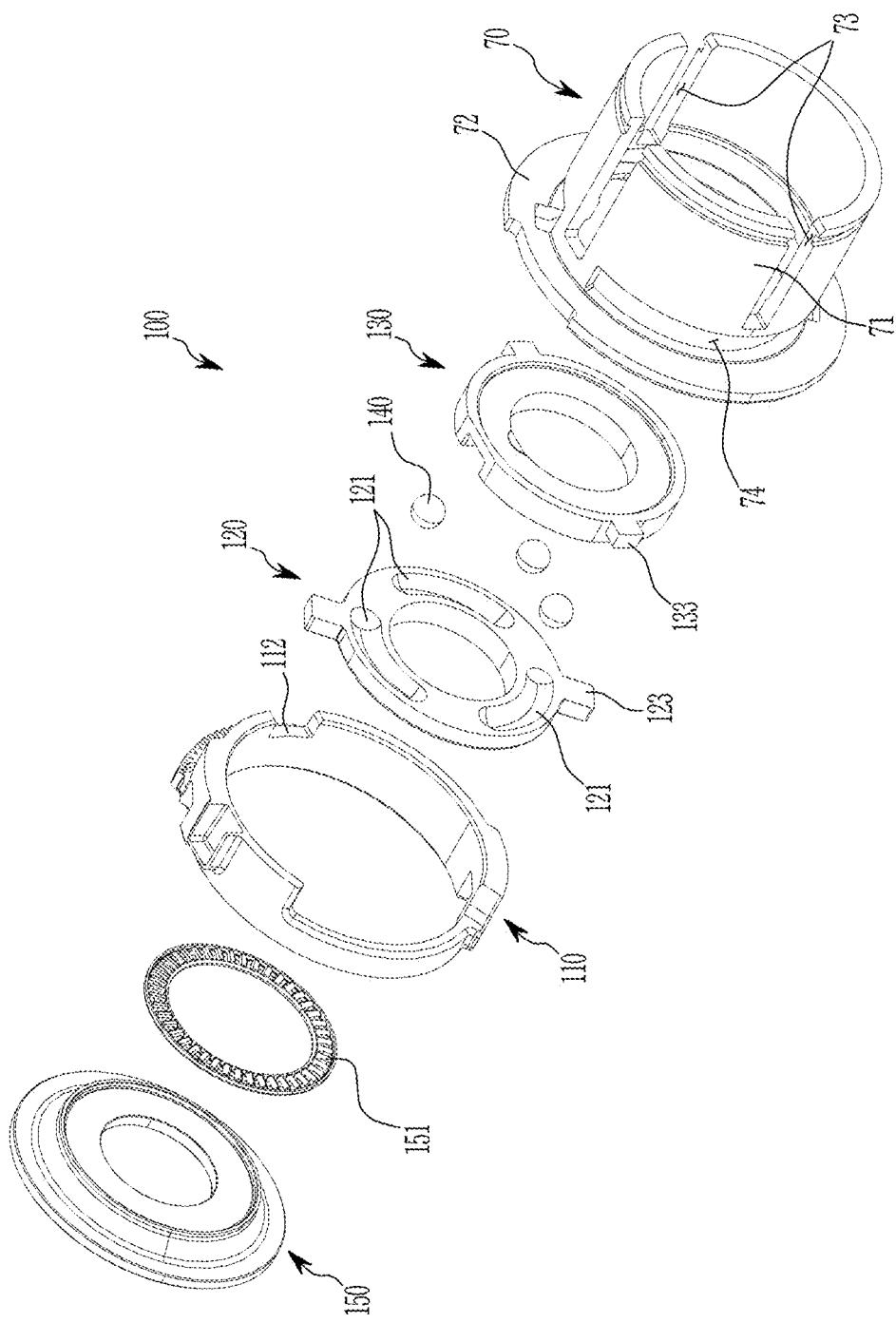
FIG. 5 and FIG. 6 are exploded perspective views exemplarily illustrating the configuration of the pressing module according to the exemplary embodiment of the present disclosure.
Figure 6:
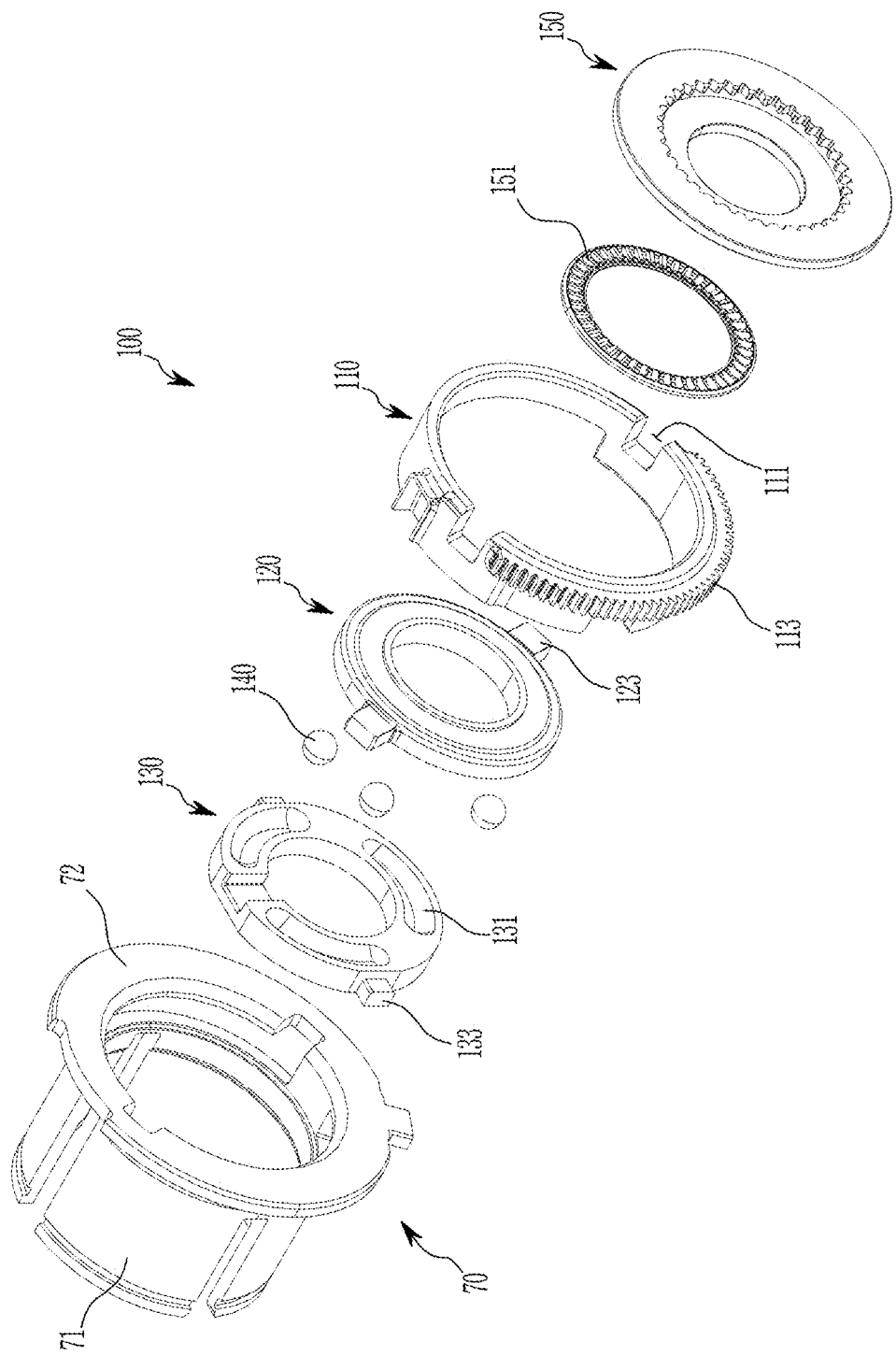
Figure 7:
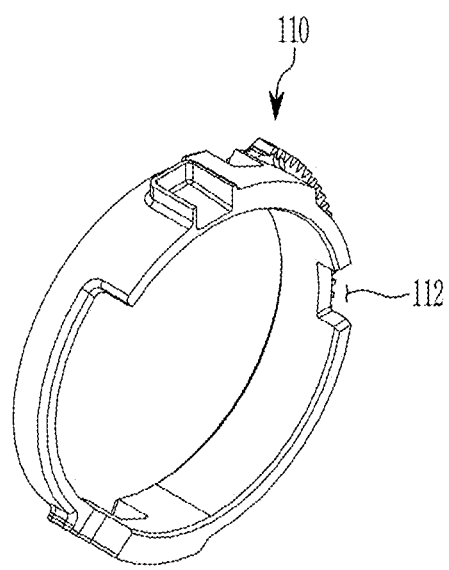
FIG. 7 and FIG. 8 are perspective views exemplarily illustrating a configuration of a ball ramp plate according to the exemplary embodiment of the present disclosure.
Figure 8:
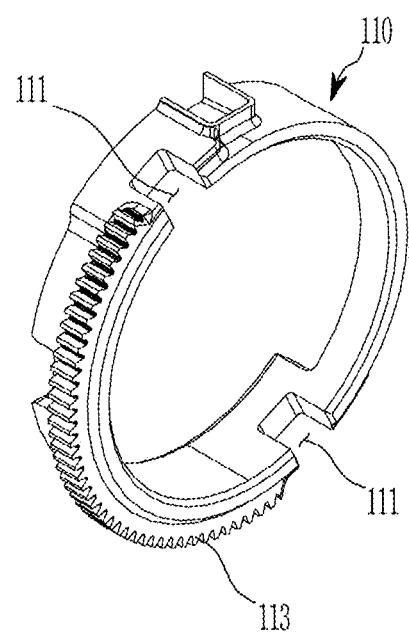
Figure 9:
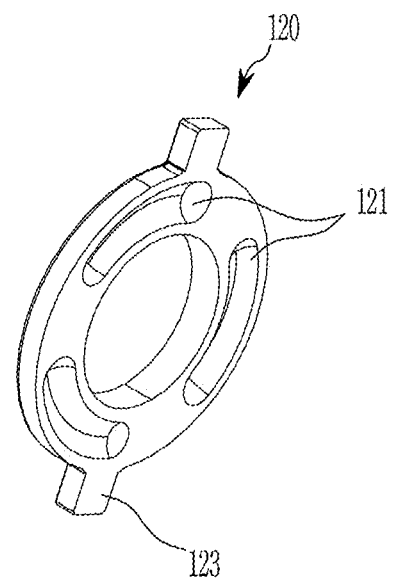
FIG. 9 is a perspective view exemplarily illustrating a configuration of a movable plate according to the exemplary embodiment of the present disclosure.
Figure 10:
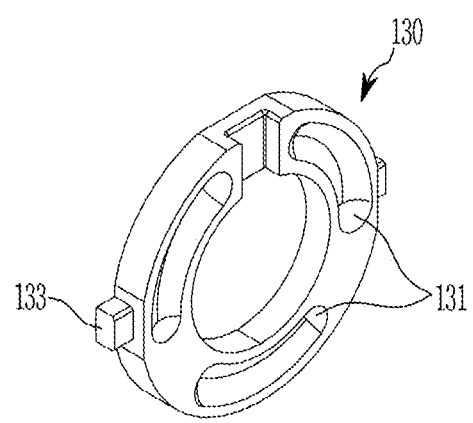
FIG. 10 is a perspective view exemplarily illustrating a configuration of a stationary plate according to the exemplary embodiment of the present disclosure.

FIG. 4 is a perspective view exemplarily illustrating a configuration of the pressing module according to the exemplary embodiment of the present disclosure. FIG. 5 and FIG. 6 are exploded perspective views exemplarily illustrating the configuration of the pressing module according to the exemplary embodiment of the present disclosure. FIG. 7 and FIG. 8 are perspective views exemplarily illustrating a configuration of the ball ramp plate according to the exemplary embodiment of the present disclosure. FIG. 9 is a perspective view exemplarily illustrating a configuration of a movable plate according to the exemplary embodiment of the present disclosure. Furthermore, FIG. 10 is a perspective view exemplarily illustrating a configuration of a stationary plate according to the exemplary embodiment of the present disclosure.

With reference to FIGS. 4 to 10, the pressing module 100 may include the ball ramp plate 110, a movable plate 120, balls 140, and a clutch pressing plate 150.

The ball ramp plate 110 may rotate within a preset angle range by receiving power from a drive motor 40. The ball ramp plate 110 is formed in an approximately annular shape including a hollow portion therein, and a ramp gear 113 may be provided on an external periphery of the ball ramp plate 110. The ramp gear 113 may be formed on the external periphery of the ball ramp plate 110 and provided by a preset angle (e.g., 130 degrees) in a circumferential direction thereof.

A pair of ramp coupling grooves 111 is formed at one side of the ball ramp plate 110, and the ramp coupling grooves 111 may be formed at positions facing each other. The movable plate 120 may be coupled to the ramp coupling grooves 111. A cam coupling groove 112 may be formed at the other side of the ball ramp plate 110. A cylindrical cam 210 to be described below may be coupled to the cam coupling groove 112.

The movable plate 120 may rotate integrally with the ball ramp plate 110, and first cam tracks 121 may be formed in the circumferential direction thereof. The movable plate 120 may move in the axial direction X while being rotated in accordance with the rotation of the ball ramp plate 110 by the first cam track 121 and the balls 140 that roll in the first cam track 121.

The movable plate 120 may be formed in an approximately circular plate shape and opened at a center portion thereof. A pair of movable protrusions 123 may be formed on an external portion of the movable plate 120. The pair of movable protrusions 123 may be formed at positions facing each other. The pair of movable protrusions 123 may be formed to correspond in position and shape to the ramp coupling grooves 111 of the ball ramp plate 110. When the movable protrusions 123 are coupled to the ramp coupling grooves 111, the ball ramp plate 110 and the movable plate 120 may rotate integrally.

The first cam tracks 121 may be formed so that the movable plate 120 moves in a first direction in the axial direction X when the movable plate 120 rotates in one direction, and the movable plate 120 may move in a second direction in the axial direction X when the movable plate 120 rotates in the other direction thereof.

The first cam track 121 is formed in an arc shape. The first cam tracks 121 may be provided as a plurality of first cam tracks 121. In the exemplary embodiment of the present disclosure, three first cam tracks 121 may be formed. The first cam tracks 121 may be disposed at equal intervals in the circumferential direction thereof. The first cam track 121 may be formed at a preset angle (e.g., 65 degrees).

Figure 11:
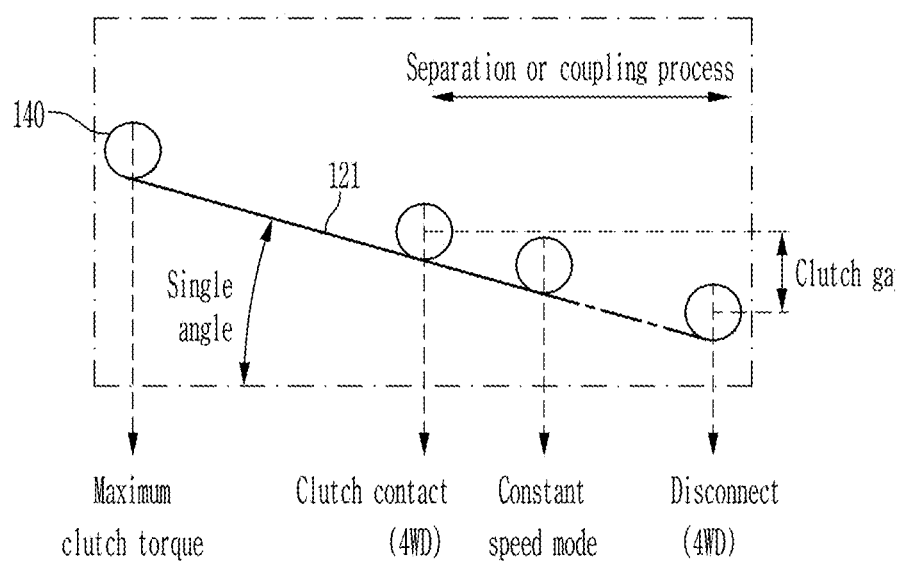
FIG. 11 is a view schematically illustrating a first cam track according to the exemplary embodiment of the present disclosure.

The first cam track 121 may be formed so that a depth increases in a direction from one side toward the other side thereof. The first cam track 121 may have a constant gradient in the circumferential direction from a first point at which the first cam track 121 is started to a second point at which the first cam track 121 is ended (see FIG. 11). Because the first cam track 121 has the constant gradient, the movable plate 120 may be precisely manufactured, the quality of the movable plate 120 may be easily managed, and the manufacturing costs may be reduced. Furthermore, because the first cam track 121 has the constant gradient as a whole, a sufficient gap may be ensured between the clutch 60 and the clutch pressing plate 150, and a drag torque of the clutch 60 may be removed when the hub clutch 20 and the output shaft 10 are separated by a disconnecting function.

The balls 140 are provided in the first cam tracks 121 so that when the movable plate 120 rotates, the movable plate 120 may be moved in the axial direction X by the rolling motions of the balls 140 provided in the first cam tracks 121.

The pressing module 100 may further include a stationary plate 130 provided to face the movable plate 120. The stationary plate 130 may be formed in an approximately circular plate shape and opened at a center portion thereof.

A pair of stationary protrusions 133 may be formed at two opposite sides of the stationary plate 130. The pair of stationary protrusions 133 may be formed at positions facing each other. The stationary plate 130 may be fixed to a guide plate 70. The pair of stationary protrusions 133 is inserted into guide shaft slots 73 formed in the guide plate 70 and does not rotate even though the ball ramp plate 110 rotates.

The opposite surface of the stationary plate 130, in which auxiliary cam tracks 131 are formed, may be supported on a dog clutch 30 provided on the hub clutch 20. Therefore, the movement of the stationary plate 130 in the axial direction X may be restricted. As necessary, a bearing may be provided between the stationary plate 130 and the dog clutch 30.

The auxiliary cam tracks 131 may be formed in one surface of the stationary plate 130 that faces the movable plate 120.

The auxiliary cam track 131 is formed in an arc shape. The auxiliary cam tracks 131 may be provided as a plurality of auxiliary cam tracks 131. In the exemplary embodiment of the present disclosure, three auxiliary cam tracks 131 may be formed while corresponding to the first cam tracks 121. The auxiliary cam tracks 131 may be disposed at equal intervals in the circumferential direction thereof. The auxiliary cam track 131 may be formed at a preset angle (e.g., 65 degrees).

The auxiliary cam tracks 131 may be formed so that the movable plate 120 moves in a first direction in the axial direction X when the movable plate 120 rotates in one direction, and the movable plate 120 may move in a second direction in the axial direction X when the movable plate 120 rotates in the other direction thereof.

The auxiliary cam track 131 may be formed so that a depth thereof decreases in the direction from one side toward the other side thereof. The auxiliary cam track 131 may have a constant gradient in the circumferential direction from a first point at which the auxiliary cam track 131 is started to a second point at which the auxiliary cam track 131 is ended.

The balls 140 may be provided between the first cam tracks 121 of the movable plate 120 and the auxiliary cam tracks 131 of the stationary plate 130. When the movable plate 120 rotates, the movable plate 120 may be moved in the axial direction X by the rolling motions of the balls 140 provided between the first cam tracks 121 and the auxiliary cam tracks 131.

The clutch pressing plate 150 may selectively press the clutch 60 by the movement of the movable plate 120 in the axial direction X. The clutch pressing plate 150 is formed in an approximately circular plate shape and opened at a center portion thereof. A radial end portion of the clutch pressing plate 150 may be bent toward the clutch 60. As necessary, a bearing may be provided between the clutch pressing plate 150 and the movable plate 120.

The ball ramp plate 110 may be rotatably supported on the guide plate 70.

The guide plate 70 may include a guide body 71 including an approximately cylindrical shape including a hollow portion therein, and a guide extension portion 72 formed at an end portion of the guide body 71.

The ball ramp plate 110 may be rotatably provided on an external periphery of the guide body 71.

The guide body 71 may have the pair of guide shaft slots 73, and the pair of guide shaft slots 73 may be formed at positions facing each other. The guide shaft slots 73 may be formed in the axial direction X. The stationary protrusion 133 of the stationary plate 130 may be inserted into the guide shaft slot 73. Therefore, the rotation of the stationary plate 130 may be restricted.

Guide circumference slots 74 may be formed in a portion where the guide body 71 and the guide extension portion 72 are connected, and the guide circumference slots 74 may be formed in the circumferential direction thereof. The movable protrusions 123 of the movable plate 120 may penetrate the guide circumference slots 74. That is, the movable protrusions 123 of the movable plate 120 may penetrate the guide circumference slots 74 and be coupled to the ramp coupling grooves 111 of the ball ramp plate 110. Therefore, the rotation of the ball ramp plate 110 and the rotation of the movable plate 120 may be allowed.

Meanwhile, the pressing module 100 may further include a return spring 160 configured to provide an elastic force in a direction in which the clutch pressing plate 150 moves away from the clutch 60. In other words, the return spring 160 may provide an elastic force in a direction in which the movable plate 120 moves toward the stationary plate 130. The return spring 160 may implement the smooth rolling motions of the balls 140 provided between the first cam tracks 121 of the movable plate 120 and the auxiliary cam tracks 131 of the stationary plate 130.

Hereinafter, a configuration of the separation module will be described in detail with reference to the accompanying drawings.

Figure 12:
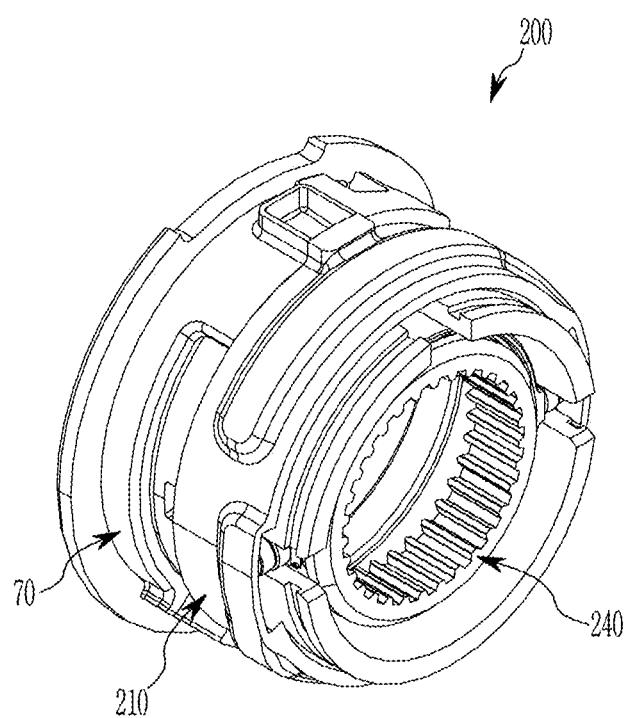
FIG. 12 is a perspective view exemplarily illustrating a configuration of a separation module according to the exemplary embodiment of the present disclosure.
Figure 13:
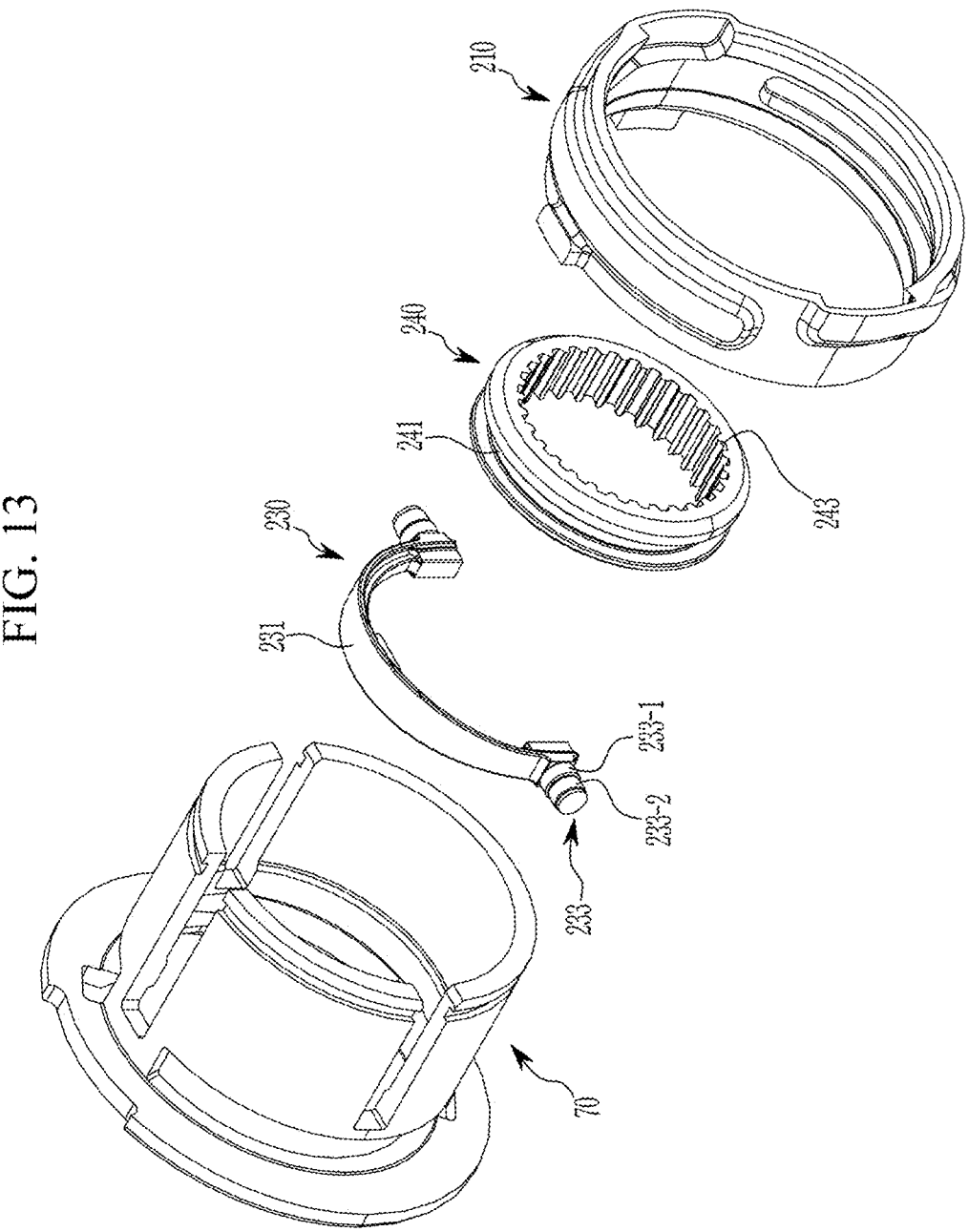
FIG. 13 is an exploded perspective view exemplarily illustrating the configuration of the separation module according to the exemplary embodiment of the present disclosure.

FIG. 12 is a perspective view exemplarily illustrating a configuration of the separation module according to the exemplary embodiment of the present disclosure. FIG. 13 is an exploded perspective view exemplarily illustrating the configuration of the separation module according to the exemplary embodiment of the present disclosure. Furthermore, FIG. 14 is a perspective view exemplarily illustrating a configuration of a cylindrical cam according to the exemplary embodiment of the present disclosure.

Figure 14:
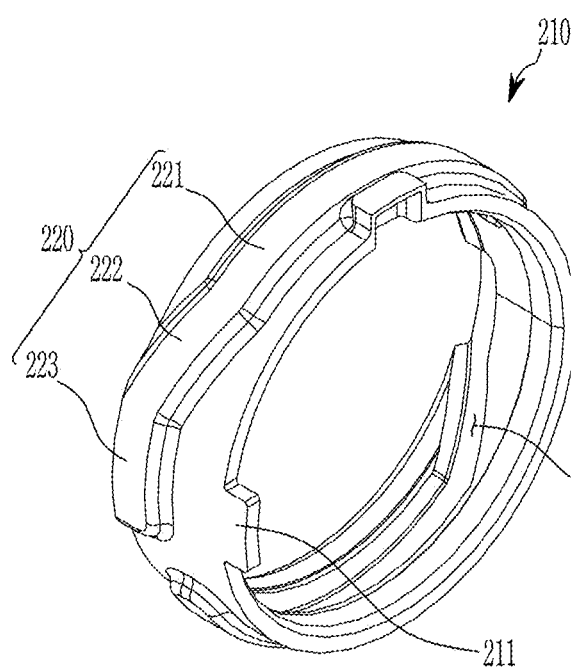
FIG. 14 is a perspective view exemplarily illustrating a configuration of a cylindrical cam according to the exemplary embodiment of the present disclosure.

With reference to FIG. 12, FIG. 13 and FIG. 14, the separation module 200 may include the cylindrical cam 210, a shift fork 230, and a sleeve 240.

The cylindrical cam 210 may rotate integrally with the ball ramp plate 110, and second cam tracks 220 may be formed in the circumferential direction thereof. The cylindrical cam 210 may be rotatably supported on the guide plate 70.

The cylindrical cam 210 may be formed in an approximately cylindrical shape including a hollow portion therein and include a cylindrical protrusion 211 extending in a direction toward the ball ramp plate 110 (toward the ball ramp plate). The cylindrical protrusion 211 is inserted into the cam coupling groove 112 formed in the ball ramp plate 110 so that the cylindrical cam 210 may rotate when the ball ramp plate 110 rotates.

The second cam track 220 may include a first portion 221 formed in a circumferential direction of the cylindrical cam 210, a second portion 222 formed to be inclined in the axial direction X from an end portion of the first portion 221, and a third portion 223 formed in the circumferential direction from an end portion of the second portion 222. In the exemplary embodiment of the present disclosure, the first portion 221 is formed at a first preset angle (e.g., 70 degrees) in the circumferential direction, the second portion 222 is formed at a second preset angle (e.g., 40 degrees) in the circumferential direction, and the third portion 223 is formed at a third preset angle (e.g., 20 degrees) in the circumferential direction thereof.

When a fork protrusion 233 of the shift fork 230 is positioned on the first portion 221, the hub clutch 20 and the output shaft 10 may be coupled by the sleeve 240. When the fork protrusion 233 of the shift fork 230 moves from the first portion 221 to the third portion 223 through the second portion 222, a process in which the hub clutch 20 and the output shaft 10 are separated may be performed. When the fork protrusion 233 of the shift fork 230 is positioned on the third portion 223, the sleeve 240 may be coupled only to the output shaft 10, and the hub clutch 20 and the output shaft 10 are uncoupled. Furthermore, when the fork protrusion 233 of the shift fork 230 moves from the third portion 223 to the first portion 221 through the second portion 222, a process in which the hub clutch 20 and the output shaft 10 are coupled may be performed.

The shift fork 230 may include a fork body 231 and the fork protrusions 233.

The fork body 231 may be formed in an approximately semicircular annular shape. The fork protrusions 233 may protrude outwardly from two opposite end portions of the fork body 231 in the radial direction thereof. The fork protrusions 233 may penetrate the guide shaft slots 73 of the guide plate 70 and be movably inserted into the second cam tracks 220 of the cylindrical cam 210. Therefore, when the cylindrical cam 210 rotates, the shift fork 230 move in the axial direction X along the second cam tracks 220. In the instant case, because the fork protrusions 233 are movably inserted into the guide shaft slots 73 of the guide plate 70, the rotation of the shift fork 230 is restricted, and only the movement of the shift fork 230 in the axial direction X may be allowed.

As necessary, fork rollers 233-1 and 233-2 may be provided on the fork protrusions 233. The fork rollers 233-1 and 233-2 may include a first roller 233-1 corresponding to the guide shaft slot 73 of the guide plate 70, and a second roller 233-2 corresponding to the second cam track 220 of the cylindrical cam 210.

The fork protrusions 233 may be movably inserted into the guide shaft slots 73 of the guide plate 70 and the second cam track 220 of the cylindrical cam 210. Because all the shift fork 230, the guide plate 70, and the cylindrical cam 210 are made of a metallic material, the metallic materials of the shift fork 230 and the guide plate 70 move relative to each other, and the metallic materials of the shift fork 230 and the cylindrical cam 210 move relative to each other. Therefore, the fork rollers 233-1 and 233-2 provided between the shift fork 230 and the guide plate 70 and between the shift fork 230 and the cylindrical cam 210 may reduce a load caused by a frictional force, prevent the components from being trapped by one another, and prevent abrasion.

The sleeve 240 may couple the output shaft 10 and the hub clutch 20 or separate the output shaft 10 and the hub clutch 20 as the shift fork 230 moves in the axial direction X.

The sleeve 240 is formed in an approximately annular shape. A sleeve spline 243 may be formed on an internal peripheral surface of the sleeve 240, and a sleeve groove 241 may be formed in an external peripheral surface of the sleeve 240.

The fork body 231 of the shift fork 230 may be inserted into the sleeve groove 241. Therefore, when the shift fork 230 moves in the axial direction X, the sleeve 240 may also move in the axial direction X.

The sleeve spline 243 may be coupled to an output spline 105 formed in the output shaft 10 at ordinary times and selectively coupled to a dog spline 31 of the dog clutch 30.

That is, when the shift fork 230 moves in one direction in the axial direction X, the sleeve spline 243 may be coupled to the dog spline 31 of the dog clutch 30 and the output spline 105 of the output shaft 10 so that the hub clutch 20 and the output shaft 10 may rotate integrally. On the other hand, when the shift fork 230 moves in the other direction in the axial direction X (i.e., when the sleeve 240 moves toward the output shaft 10), the sleeve spline 243 of the sleeve 240 may be uncoupled from the dog spline 31 of the dog clutch 30, and the hub clutch 20 and the output shaft 10 may be separated.

With reference back to FIG. 1, FIG. 2, and FIG. 3, the hub clutch 20 and the output shaft 10 may be rotatably provided while penetrating the pressing module 100 and the separation module 200. The hub clutch 20 and the output shaft 10 may be disposed coaxially.

The hub clutch 20 may be coupled to a side gear of a differential, and the output shaft 10 may be coupled to a wheel of the vehicle. The dog clutch 30 may be integrally coupled to the hub clutch 20. As described above, the output shaft 10 and the hub clutch 20 may be selectively coupled as the sleeve 240 moves.

That is, the output shaft 10 and the hub clutch 20 may be separated when the sleeve 240 moves in the axial direction X in one direction (the direction toward the output shaft 10). When the output shaft 10 and the hub clutch 20 are separated, a reverse rotation force, which is transmitted to a wheel when the vehicle travels in a two-wheel drive mode, may be prevented from being transmitted to a drive motor, a speed reducer, and the like, which may prevent the drive motor, the speed reducer, and the like from rotating unnecessarily. Therefore, it is possible to improve efficiency of a drive system of the vehicle.

When the sleeve 240 moves in the axial direction X in the other direction (the direction toward the clutch 60), the output shaft 10 and the hub clutch 20 may be coupled. When the output shaft 10 and the hub clutch 20 are coupled, power from a driving source may be transmitted to the wheel.

The disconnecting device according to the exemplary embodiment of the present disclosure may further include the drive motor 40 configured to provide power for rotating the ball ramp plate 110, and a speed reducer 50 configured to decelerate power of the drive motor 40.

The power generated by the drive motor 40 may be transmitted to the ball ramp plate 110 through the speed reducer 50. The drive motor 40 may be an electric motor.

The speed reducer 50 may gear-engage with the ball ramp gear 113 provided on the external periphery of the ball ramp plate 110. The speed reducer 50 may be implemented by a gear train or a worm gear.

Hereinafter, an operation of the disconnecting device according to the exemplary embodiment of the present disclosure will be described in detail.

First, a process of shifting a state from a state in which the hub clutch 20 and the output shaft 10 are uncoupled to a state in which the hub clutch 20 and the output shaft 10 are coupled and the clutch pressing plate 150 presses the clutch 60 will be described.

Figure 15:
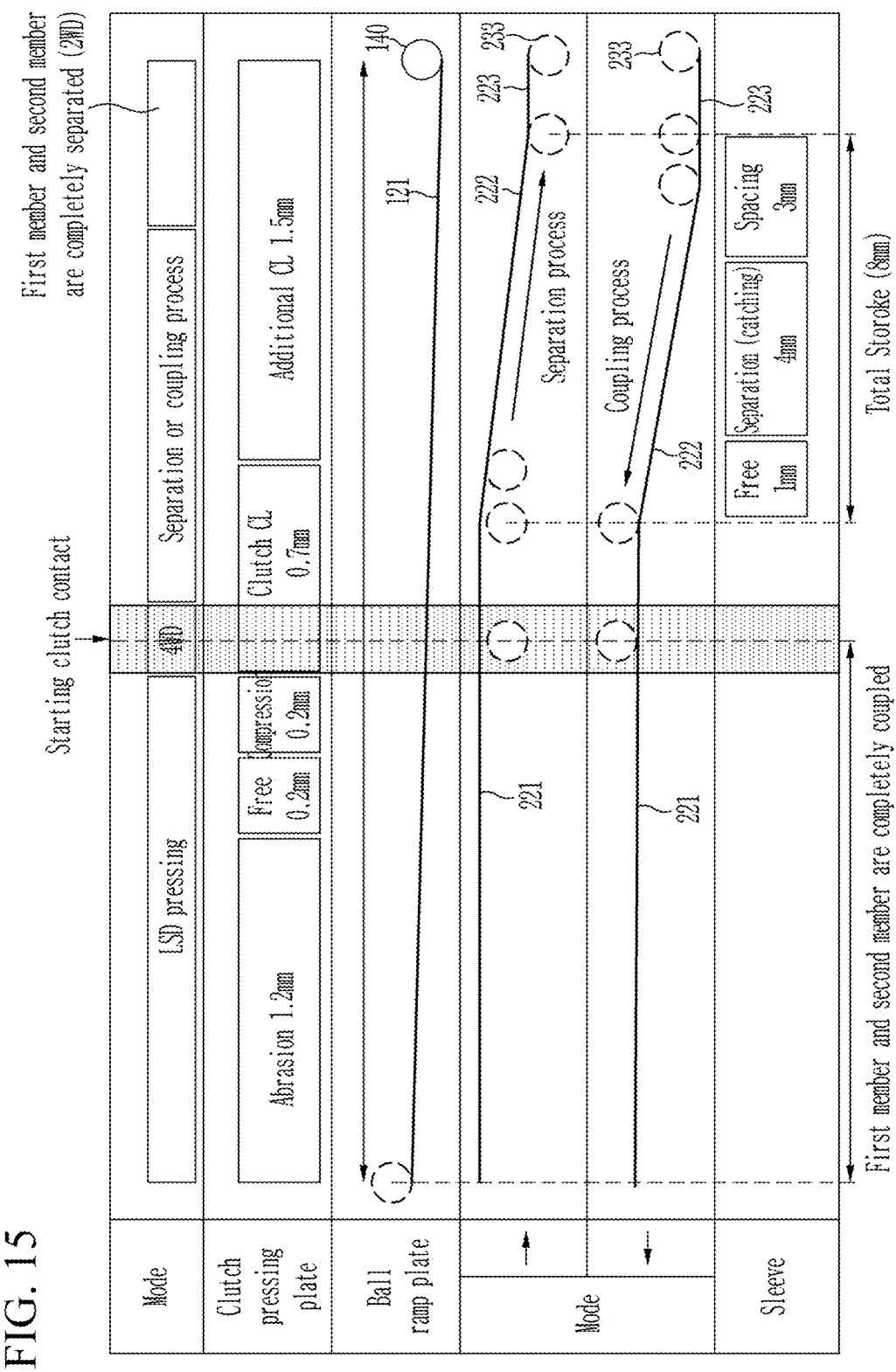
FIG. 15 is a view for explaining an operation of the disconnecting device according to the exemplary embodiment of the present disclosure.

With reference to FIG. 15, in the state in which the hub clutch 20 and the output shaft are uncoupled, the sleeve 240 is coupled to the output spline of the output shaft 10, and the sleeve spline 243 of the sleeve 240 is not coupled to the dog spline 31 of the dog clutch 30 of the hub clutch 20. Therefore, the state in which the hub clutch 20 and the output shaft 10 are separated may be maintained.

When the power is transmitted from the drive motor 40 through the speed reducer 50, the ball ramp plate 110 rotates in one direction, and the movable plate 120 coupled to the ball ramp plate 110 may also rotate in one direction thereof.

When the movable plate 120 rotates in one direction, the movable plate 120 is moved in one direction in the axial direction X by the rolling motions of the balls 140 provided between the first cam tracks 121 of the movable plate 120 and the auxiliary cam tracks 131 of the stationary plate 130. When the movable plate 120 moves in one direction in the axial direction X, the clutch pressing plate 150 is moved in one direction in the axial direction X by the movement of the movable plate 120, and the clutch pressing plate 150 approaches the clutch 60.

When the ball ramp plate 110 and the movable plate 120 rotate, the movable plate 120 and the clutch pressing plate 150 gradually move toward the clutch 60 so that the clutch pressing plate 150 begins to come into contact with the clutch 60.

When the ball ramp plate 110 and the movable plate 120 further rotate, the movable plate 120 and the clutch pressing plate 150 further move in one direction in the axial direction X, and the clutch pressing plate 150 presses the clutch 60 so that clutch torque of the clutch 60 gradually increases.

When the ball ramp plate 110 and the movable plate 120 rotate to a maximum position, the movable plate 120 and the clutch pressing plate 150 also move to the maximum position in one direction in the axial direction X, and the clutch pressing plate 150 maximally presses the clutch 60 so that the clutch torque of the clutch 60 becomes maximum torque.

At the same time, when the ball ramp plate 110 rotates in one direction, the cylindrical cam 210 coupled to the ball ramp plate 110 also rotates in one direction thereof.

When the cylindrical cam 210 rotates in one direction, the fork protrusions 233 of the shift fork 230 provided in the second cam tracks 220 of the cylindrical cam 210 move in one direction in the axial direction X along the second cam tracks 220. In the instant case, the fork protrusion 233 of the shift fork 230 moves from the third portion 223 of the second cam track 220 along the second portion 222.

When the fork protrusion 233 moves from the third portion 223 of the second cam track 220 to the second portion 222, the sleeve 240 coupled to the shift fork 230 moves in one direction in the axial direction X. When the sleeve 240 moves in one direction in the axial direction X, the sleeve spline 243 of the sleeve 240 begins to be coupled to the dog spline 31 of the dog clutch 30 of the hub clutch 20.

When the cylindrical cam 210 further rotates, the shift fork 230 moves from the second portion 222 to the first portion 221, and the sleeve 240 coupled to the shift fork 230 further moves in one direction in the axial direction X. When the sleeve 240 further moves in one direction in the axial direction X, the fork protrusion 233 of the shift fork 230 moves from the second portion 222 to the first portion 221, and the sleeve spline 243 of the sleeve 240 and the dog spline 31 of the dog clutch 30 of the hub clutch 20 are completely coupled. Therefore, the hub clutch 20 and the output shaft 10 are completely coupled to each other and rotate integrally with each other.

When the cylindrical cam 210 further rotates, the fork protrusion 233 of the shift fork 230 moves along the first portion 221 but does not move in the axial direction X.

In the exemplary embodiment of the present disclosure, during the process of coupling the hub clutch 20 and the output shaft 10, the clutch pressing plate 150 does not come into contact with the clutch 60 before the hub clutch 20 and the output shaft 10 are coupled by the sleeve 240. That is, the clutch pressing plate 150 of the pressing module 100 and the clutch 60 begin to come into contact with each other after the hub clutch 20 and the output shaft 10 are completely coupled by the sleeve 240 of the separation module 200.

The movable plate 120 presses the clutch 60 when the ball ramp plate 110 further rotates and the movable plate 120 moves in the axial direction X toward the clutch 60 after the clutch pressing plate 150 and the clutch 60 come into contact with each other. In the instant case, when the ball ramp plate 110 rotates, the cylindrical cam 210 also rotates, but the fork protrusion 233 of the shift fork 230 does not move any further in the axial direction X because the fork protrusion 233 is positioned on the first portion 221.

Because the process of separating the hub clutch 20 and the output shaft 10 is performed in the reverse order to the above-mentioned process, a detailed description thereof will be omitted.

According to the exemplary embodiment of the present disclosure, the pressing module 100, which presses the clutch 60, and the separation module 200, which selectively couple the hub clutch 20 and the output shaft 10, are disposed coaxially, which may reduce the overall size of the disconnecting device and implement the compact package of the vehicle.

Furthermore, the single motor and the ball ramp plate 110 may allow the pressing module 100 to press the clutch 60 and allow the output shaft 10 and the hub clutch 20 to be selectively coupled. Therefore, it is possible to reduce the number of components and manufacturing costs of the disconnecting device.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A disconnecting apparatus comprising:
    a ball ramp plate rotatably provided on a guide plate;
    a pressing module provided coaxially with the ball ramp plate and configured to selectively press a clutch while being moved in an axial direction by a rotation of the ball ramp plate; and
    a separation module provided coaxially with the pressing module and configured to selectively separate a first member and a second member in accordance with the rotation of the ball ramp plate,
    wherein the separation module includes:
        a cylindrical cam configured to rotate integrally with the ball ramp plate;
        a shift fork configured to be moved in the axial direction by a rotation of the cylindrical cam; and
        a sleeve configured to couple the first member and the second member or separate the first member and the second member in accordance with a movement of the shift fork.

2. The disconnecting apparatus of claim 1, wherein the pressing module includes:
    the ball ramp plate;
    a movable plate engaged to the ball ramp plate and configured to move in the axial direction while being rotated by the rotation of the ball ramp plate, the movable plate including a first cam track formed in a circumferential direction thereof;
    a ball provided in the first cam track; and
    a clutch pressing plate configured to selectively press the clutch in accordance with the movement of the movable plate in the axial direction.

3. The disconnecting apparatus of claim 2, wherein the first cam track is formed so that the movable plate moves in a first direction in the axial direction in response that the movable plate rotates in one direction, and the movable plate moves in a second direction in the axial direction in response that the movable plate rotates in another direction.

4. The disconnecting apparatus of claim 3,
    wherein the first cam track is formed in an arc shape on a first side to a second side of the first cam track and the first cam track is formed so that a depth thereof increases in a direction from the first side to the second side.

5. The disconnecting apparatus of claim 4, wherein the first cam track has a constant gradient between the first side and the second side of the first cam track.

6. The disconnecting apparatus of claim 5, wherein a pair of movable protrusions formed on an external portion of the movable plate is coupled to ramp coupling grooves formed in the ball ramp plate.

7. The disconnecting apparatus of claim 6, wherein the movable protrusions penetrate guide circumference slots formed in the guide plate in a circumferential direction of the guide plate and are coupled to the ramp coupling grooves.

8. The disconnecting apparatus of claim 2, wherein the pressing module further includes a stationary plate provided to face the movable plate.

9. The disconnecting apparatus of claim 8,
    wherein an auxiliary cam track corresponding to the first cam track is formed in the stationary plate, and
    wherein the ball is mounted between the first cam track and the auxiliary cam track.

10. The disconnecting apparatus of claim 9, wherein the auxiliary cam track has a constant gradient between a first side and a second side of the auxiliary cam track.

11. The disconnecting apparatus of claim 2, wherein the pressing module further includes a return spring providing an elastic force in a direction in which the clutch pressing plate moves away from the clutch.

12. The disconnecting apparatus of claim 2, further including:
    a bearing mounted between the clutch pressing plate and the movable plate.

13. The disconnecting apparatus of claim 1,
    wherein the cylindrical cam includes a second cam track formed in a circumferential direction of the cylindrical cam, and the shift fork provided in the second cam track.

14. The disconnecting apparatus of claim 13, wherein the second cam track is formed so that the shift fork moves in one direction in the axial direction in response that the cylindrical cam rotates in a first direction, and the shift fork moves in another direction in the axial direction in response that the cylindrical cam rotates in a second direction.

15. The disconnecting apparatus of claim 13, wherein the second cam track includes:
- a first portion formed in a circumferential direction of the cylindrical cam;
- a second portion formed to be inclined in the axial direction from an end portion of the first portion; and
- a third portion formed in the circumferential direction from an end portion of the second portion.

16. The disconnecting apparatus of claim 13, wherein the shift fork includes:
- a fork body integrally coupled to the sleeve; and
- fork protrusions provided at first and second opposite sides of the fork body and movably mounted in the second cam track.

17. The disconnecting apparatus of claim 16, wherein the fork protrusion is provided to penetrate a guide shaft slot formed in the guide plate in the axial direction and is movably mounted in the second cam track.

18. The disconnecting apparatus of claim 1, further including:
- a drive motor configured to provide power for rotating the ball ramp plate; and
- a speed reducer engaged to the drive motor and configured to decelerate power of the drive motor and gear-engage with a ramp gear formed on an external periphery of the ball ramp plate.

19. The disconnecting apparatus of claim 1, wherein the pressing module and the clutch come into contact with each other after the first member and the second member are completely coupled by the separation module.

* * * * *